July 2, 1968  E. T. MYSKOWSKI  3,390,492
DEEP SUBMERGENCE MODULE
Filed Dec. 20, 1966
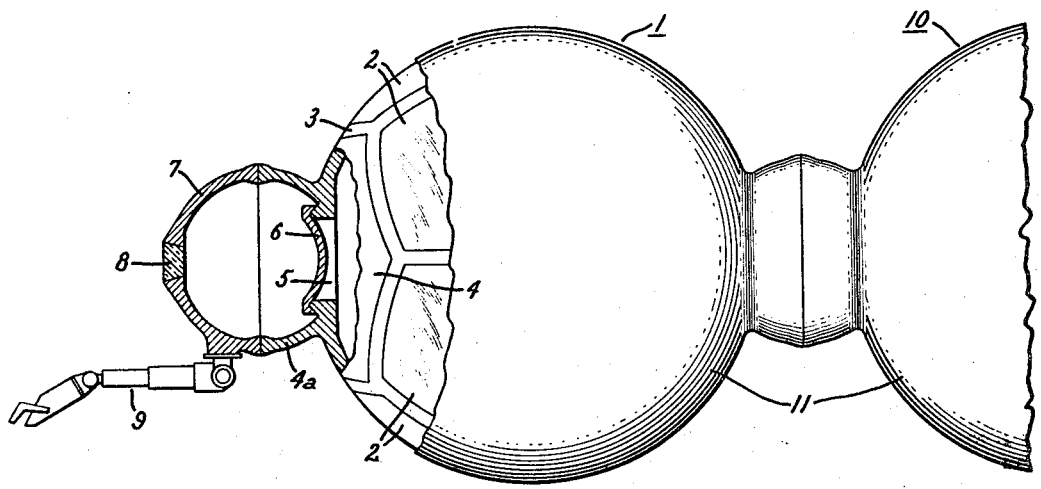
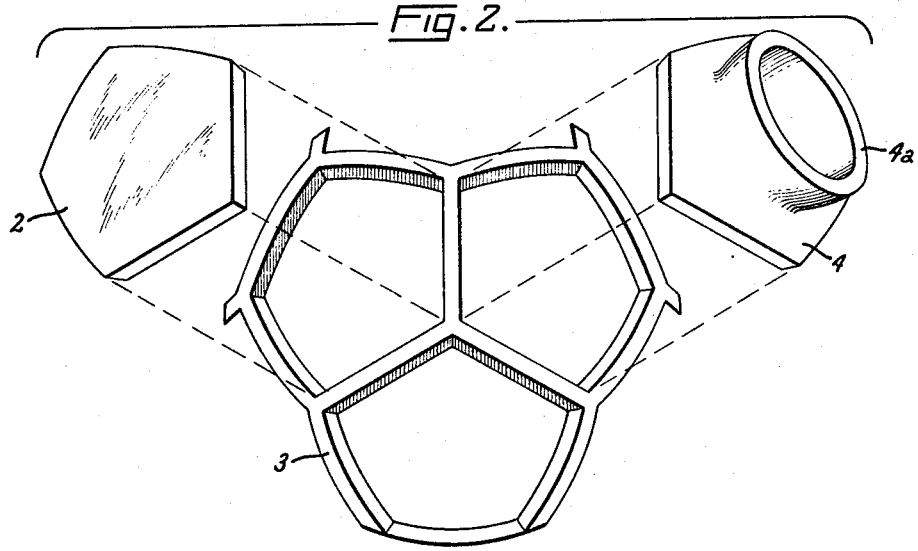
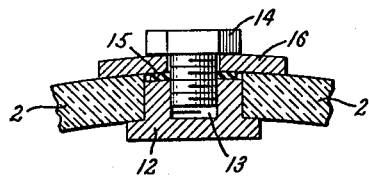
INVENTOR:
EDWIN T. MYSKOWSKI,
BY
AGENT

United States Patent Office 3,390,492
Patented July 2, 1968

---

3,390,492
DEEP SUBMERGENCE MODULE
Edwin Theophilus Myskowski, Wayne, Pa., assignor to General Electric Company, a corporation of New York
Filed Dec. 20, 1966, Ser. No. 603,207
7 Claims. (Cl. 52—80)

ABSTRACT OF THE DISCLOSURE

A composite devitrified glass-titanium alloy structure comprises an enclosed, generally spherical chamber, capable of withstanding great compressive force. A plurality of segments of devitrified glass form the primary load-bearing elements of the chamber. These segments are bounded by extremely flat edge surfaces which lie in radial planes of the sphere. The segments are supported by a titanium-based alloy frame having extremely flat surfaces coextensively adjoining all of the edge surfaces of the devitrified glass segments.

Introduction

This invention relates to an enclosed chamber capable of withstanding great external compressive force and more particularly to a segmented, enclosed, generally spherical chamber which may be used for exploring and exploiting deep water environments. More specifically, this invention relates to a deep water submergence module.

Background

It has been known for some time that many military and scientific purposes could be served by a device which permitted man, together with necessary equipment, to spend substantial lengths of time in deep water environments. This has been generally impractical due to the unavailability of a submergence module strong enough to withstand the compressive force at great underwater depths and large enough to house the men and equipment necessary to carry on this type of activity.

Efforts to develop such a module have been directed primarily to vehicles which have been severely limited by capacity, strength, and complexity. The reasons for this are varied but center principally on the fact that while glass and certain other materials are sufficiently strong to withstand great compressive force when fabricated in small units, the technology has been such that the applications of the same techniques and materials to larger units has not been feasible. This is due, in turn, to the fact that in making large units, single unit exterior construction is impractical because of the massive nature of the single unit that would be required and segmented units are impractical because of the difficulty of forming joint structures capable of withstanding great compressive forces between structural segments comprised of materials having the necessary compressive strength. Generally the problem is one of producing a joint structure which does not fail through breakdown induced by localized stress concentrations in the joint.

It is necessary therefore to use materials of construction which themselves can withstand the compressive force exerted on a deep submergence module. Further, for a unit of any substantial size, the outer structure must be segmented and the joint structures between these segments must have good compressive strength. Heretofore, no such construction or combination of materials rendering such construction possible has been known.

Objects

With a view to these problems, it is an object of the present invention to provide a segmented structure capable of withstanding large compressive force.

Another object of this invention is to provide a large enclosed chamber capable of withstanding great compressive force.

Still another object of this invention is to provide a relatively large module suitable for use as a deep submergence vehicle.

Brief summary of invention

These and other objects are met, in accordance with the present invention by a large, generally spherical chamber comprising a plurality of segments composed of a devitrified glass material and a frame for supporting these segments, comprised primarily of titanium-based alloys.

In the preferred embodiment of the present invention, the enclosed chamber comprises twelve spherical segments, each of which is bounded by a pentagonal edge and the devitrified glass is that commercially available from the Corning Glass Works, Corning, N.Y., under the trademark Pyroceram. The frame in the preferred embodiment, comprises an alloy of 6% aluminum, 4% vanadium, and balance titanium.

Detailed description of invention

While the specification concludes with claims particularly pointing out and distinctly claiming the subject matter of the present invention, this invention may be better understood from the following description, taken in conjunction with the following drawings, in which:

FIGURE 1 is a partially cut-away vew of the deep submergence module of the present invention mated with other deep submergence modules;

FIGURE 2 shows the primary components of the present invention;

FIGURE 3 is a detailed cross-sectional view of a typical joint between the structural segments and the frame of the deep submergence module shown in FIGURE 1; and FIGURE 4 is a detailed cross-sectional view of another typical joint between the structural segments and the frame of the deep submergence vehicle shown in FIGURE 1.

Referring more specifically to FIGURE 1, there is shown an enclosed chamber 1 capable of withstanding great compressive force and referred to otherwise herein as a deep submergence module. The deep submergence module 1 is comprised of a plurality of spherical segments 2 having pentagonal edges. Spherical segments 2 are comprised of a devitrified galss material of the type disclosed in U.S. Patent 2,920,971 to Donald Stookey. Specifically Pyroceram devitrified glass, commercially available from Corning Glass Works, is preferred. Supporting each of the spherical segments 2 at the boundaries thereof through extremely flat, coextensively adjoining surfaces, is a frame 3 comprised of a titanium based alloy, including in the preferred embodiment, 6% aluminum and 4% vanadium.

For entrance and exit from the deep submergence module 1, one or more of the spherical segments may comprise an access segment 4, shown partially in cross section in FIGURE 1, including a projecting portion 4a, and an exit and entrance passageway 5, closed by hatch cover 6. Connection may be made through access segment 4 to other underwater apparatus. For example, as shown in FIGURE 1, the mating of projecting portion 4a with a hemispherical element 7, which includes an observation port 8 and a manipulator 9, forms a satellite work and observation module, directly accessible through passageway 5, upon removal of hatch cover 6, from the deep submergence module 1 of the present invention. Similarly, semi-permanent connection may be made through other access segments of the deep submergence module 1 to other deep submergence modules identical to or similar to that of the present invention. Thus, as shown in FIGURE

6. A joint structure, capable of withstanding high compressive force exerted across the interface thereof, comprising an extremely smooth devitrified glass surface co-extensively adjoining an extremely smooth surface of a titanium-based alloy.

7. A joint structure, such as that recited in claim 6, wherein a thin layer of compatible ductile metal is interposed between said adjoining surfaces.

References Cited

UNITED STATES PATENTS

| | | | |
|---|---|---|---|
| 2,479,217 | 8/1949 | Diamond | 61—69 |
| 2,711,181 | 6/1955 | Woods | 52—80 |
| 3,261,317 | 7/1966 | Gignoux | 114—16 |

FRANK L. ABBOTT, *Primary Examiner.*

S. D. BURKE, *Assistant Examiner.*